US010563763B1

(12) United States Patent
DeJohn et al.

(10) Patent No.: US 10,563,763 B1
(45) Date of Patent: Feb. 18, 2020

(54) TANK PISTON WITH IMPROVED SEAL AND COVER

(71) Applicant: Piston Tank Corporation, Fenton, MO (US)

(72) Inventors: Anthony Frank DeJohn, Chesterfield, MO (US); Christopher Keith Duncan, Bunker Hill, IL (US)

(73) Assignee: Piston Tank Corporation, Fenton, MO (US)

( * ) Notice: Subject to any disclaimer, the term of this patent is extended or adjusted under 35 U.S.C. 154(b) by 170 days.

(21) Appl. No.: 15/938,343

(22) Filed: Mar. 28, 2018

Related U.S. Application Data

(60) Provisional application No. 62/479,806, filed on Mar. 31, 2017.

(51) Int. Cl.
*F16J 9/10* (2006.01)
*F15B 15/10* (2006.01)
*F16J 9/12* (2006.01)
*F16J 15/46* (2006.01)

(52) U.S. Cl.
CPC ............... *F16J 9/10* (2013.01); *F15B 15/10* (2013.01); *F16J 9/12* (2013.01); *F16J 15/46* (2013.01)

(58) Field of Classification Search
CPC ........ F16J 9/10; F16J 9/12; F16J 15/46; F16J 15/56; F15B 15/1452
See application file for complete search history.

(56) References Cited

U.S. PATENT DOCUMENTS

| | | | |
|---|---|---|---|
| 2,559,564 A | 7/1951 | Spelling | |
| 2,843,154 A | 7/1958 | Hosking | |
| 2,859,061 A | 11/1958 | Reid | |
| 3,043,340 A | 7/1962 | Rehbock | |
| 3,125,346 A | 3/1964 | Poltorak | |
| 3,178,779 A | 4/1965 | Etal | |
| 3,321,110 A | 5/1967 | Price | |
| 3,828,988 A | 8/1974 | Berry | |
| 3,940,152 A | 2/1976 | Fournier | |
| 4,178,000 A | 12/1979 | Kuttner | |
| 4,342,336 A | 8/1982 | Satterthwaite et al. | |
| 4,721,235 A | 1/1988 | Watson | |
| 4,982,864 A | 1/1991 | Kusta | |
| 5,114,054 A | 5/1992 | Watson | |
| 5,341,726 A | 8/1994 | Watson | |
| 5,385,081 A | 1/1995 | Sneddon | |
| 5,598,762 A | 2/1997 | Sneddon | |
| 5,746,112 A | 5/1998 | Watson | |
| 5,882,605 A | 3/1999 | Sortwell | |

(Continued)

*Primary Examiner* — Michael Leslie
(74) *Attorney, Agent, or Firm* — Creativenture Law, LLC; Dennis J M Donahue, III; Kevin C. Staed

(57) ABSTRACT

The present invention relates to a tank piston with an improved seal having a cap, a body attached to the periphery of the cap, a circumferential channel adjacent to the periphery of the cap and an annular seal held within the channel by an annular sheet. In one aspect of the invention the annular sheet secures the seal within the channel and is attached to the piston by a ring proximate to the periphery of the cap and a ring proximate to the back side of the circumferential channel. In another aspect of the invention the annular sheet is made from a friction reducing material and enables the piston to more easily move within the tank and subsequently extends the lifespan of the seal. Additionally, the annular sheet is fitted to the seal and attached above the front sidewall of the channel.

20 Claims, 9 Drawing Sheets

(56) References Cited

U.S. PATENT DOCUMENTS

| | | |
|---|---|---|
| 5,961,128 A | 10/1999 | Klammer |
| 6,027,123 A | 2/2000 | Berry, Sr. et al. |
| 6,206,248 B1 | 3/2001 | Popp et al. |
| 6,325,383 B1 | 12/2001 | Kahle et al. |
| 6,325,384 B1 | 12/2001 | Berry, Sr. et al. |
| 6,796,463 B2 | 9/2004 | Boal, Jr. |
| 6,916,025 B2 | 7/2005 | Brisson |
| 7,159,508 B1 | 1/2007 | Brisner |
| 7,762,434 B2 | 7/2010 | Thibodeau et al. |
| 7,997,445 B2 | 8/2011 | Thibodeau et al. |
| 8,640,918 B2 | 2/2014 | Thibodeau et al. |
| 8,759,652 B2 | 6/2014 | Caprarola |
| 2003/0122317 A1 | 7/2003 | Andersson |
| 2003/0141320 A1 | 7/2003 | Coleman |
| 2007/0090132 A1 | 4/2007 | Williams et al. |

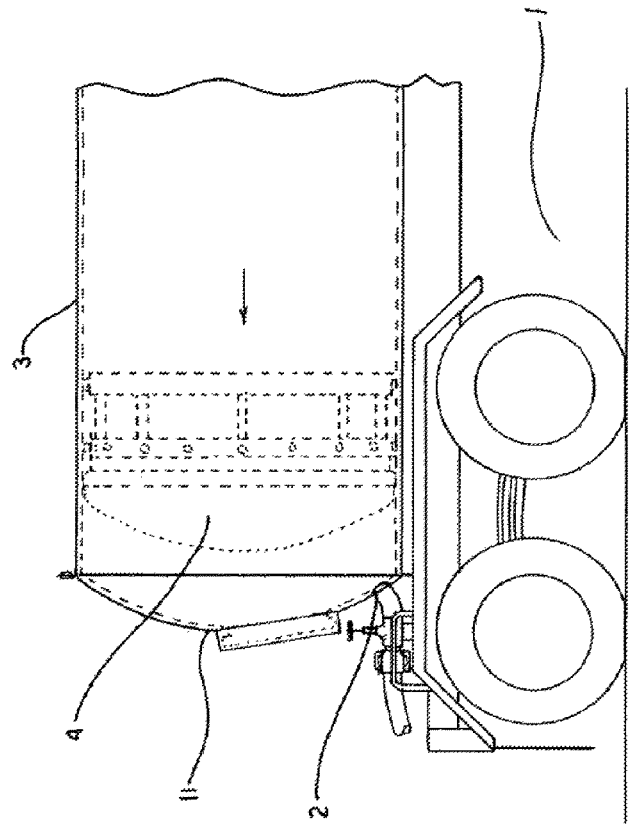
Fig. 1A (PRIOR ART)
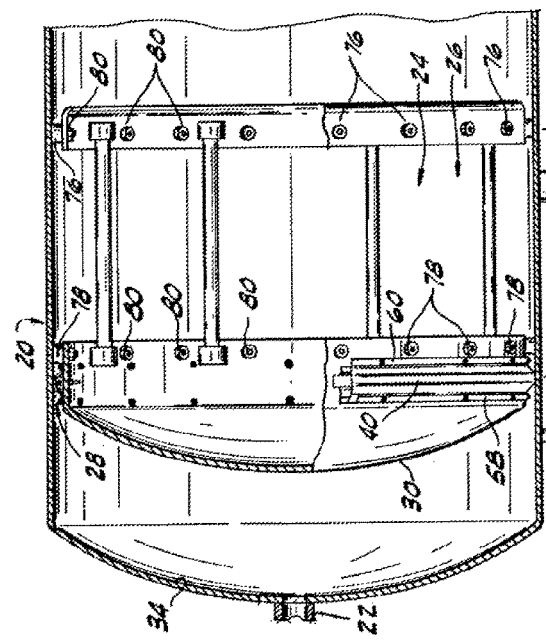
Fig. 1C (PRIOR ART)
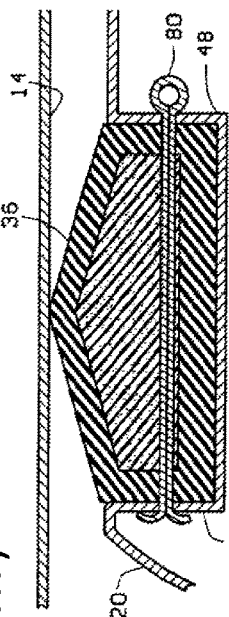
Fig. 1D (PRIOR ART)
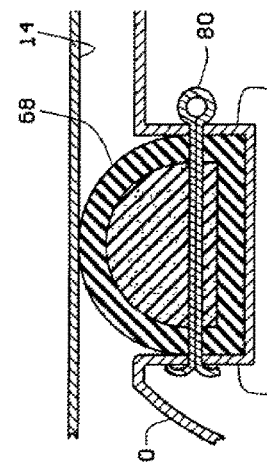
Fig. 1B (PRIOR ART)
Fig. 1E (PRIOR ART)

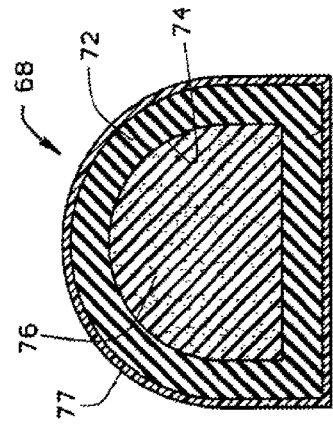
Fig. 1F (PRIOR ART)
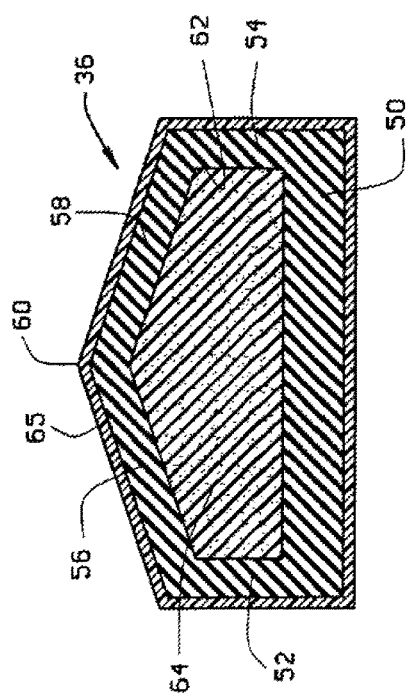
Fig. 1G (PRIOR ART)
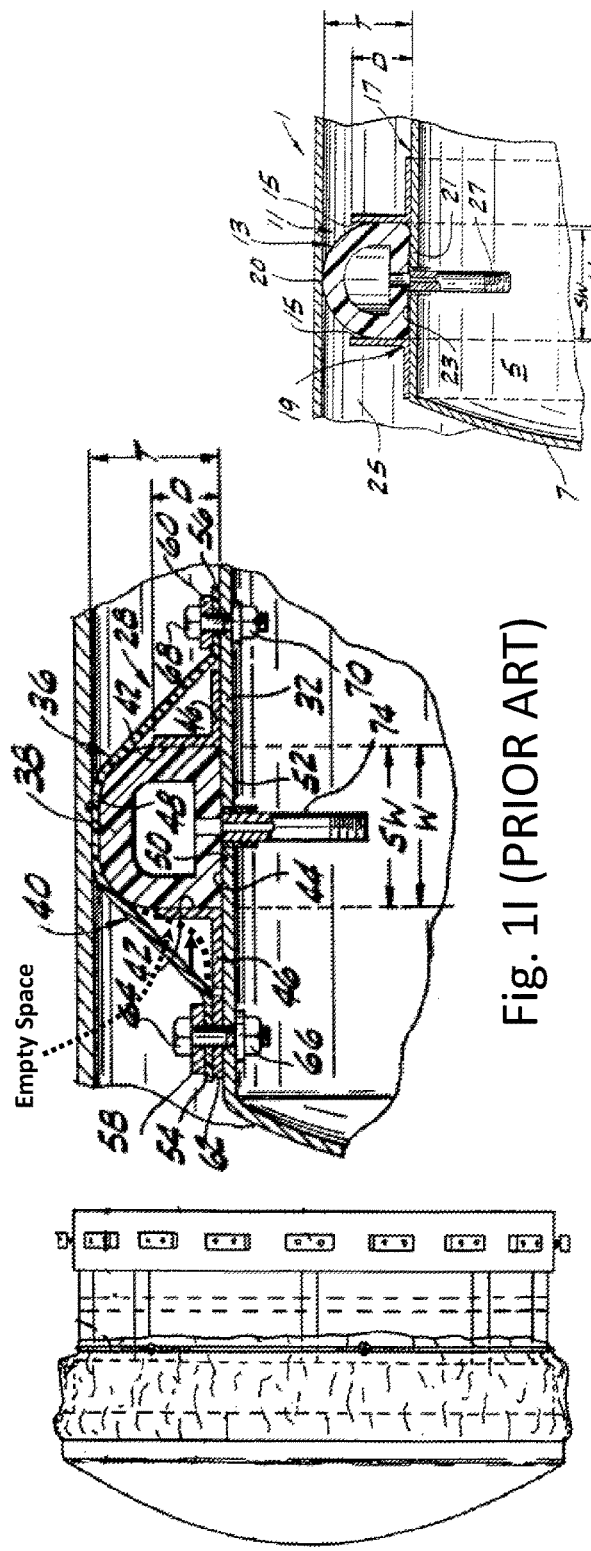
Fig. 1J (PRIOR ART)
Fig. 1I (PRIOR ART)
Fig. 1H (PRIOR ART)

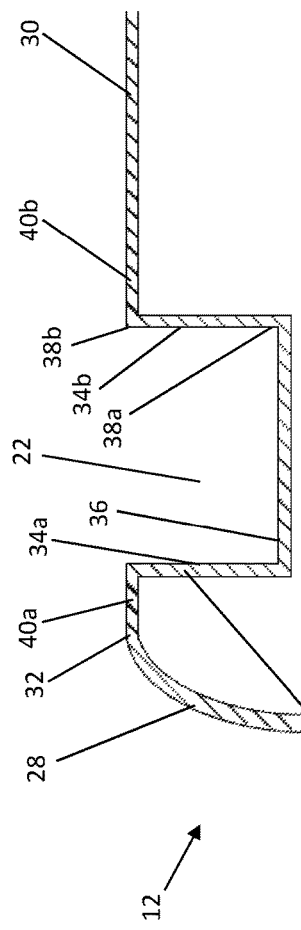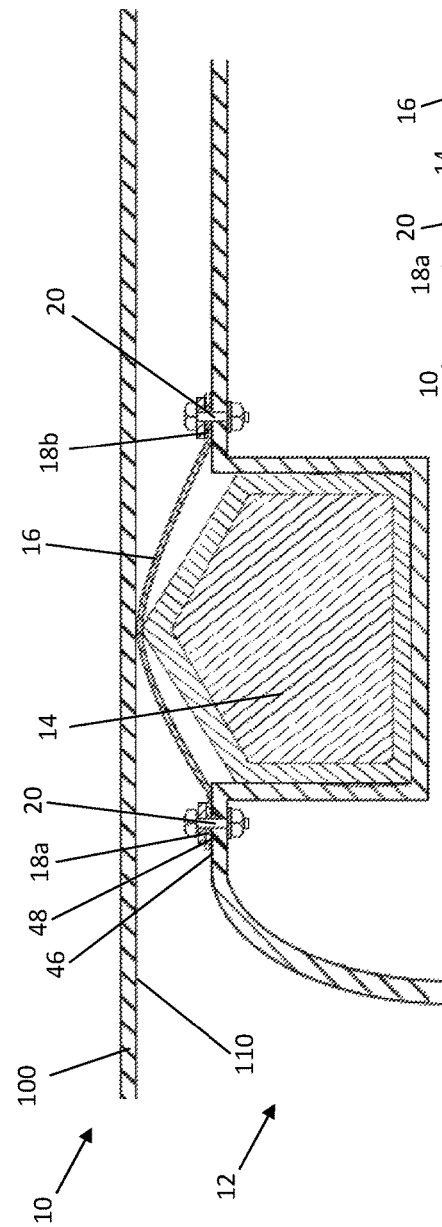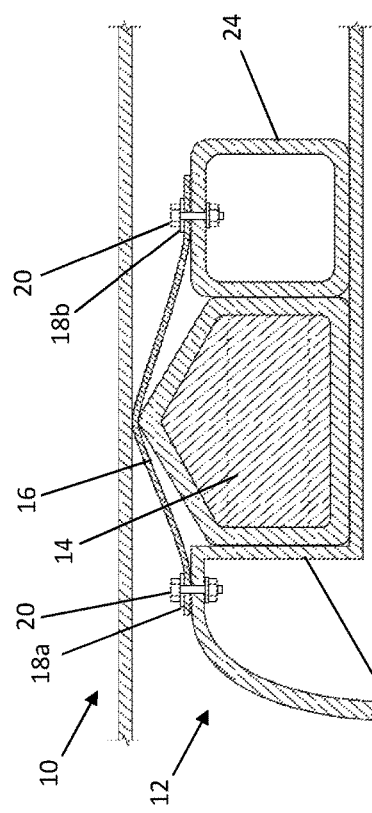

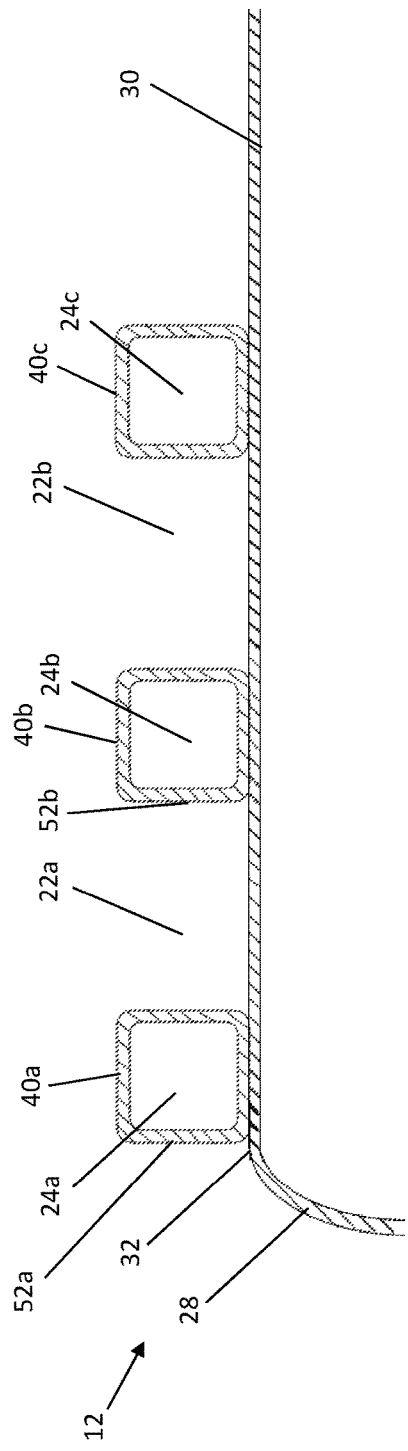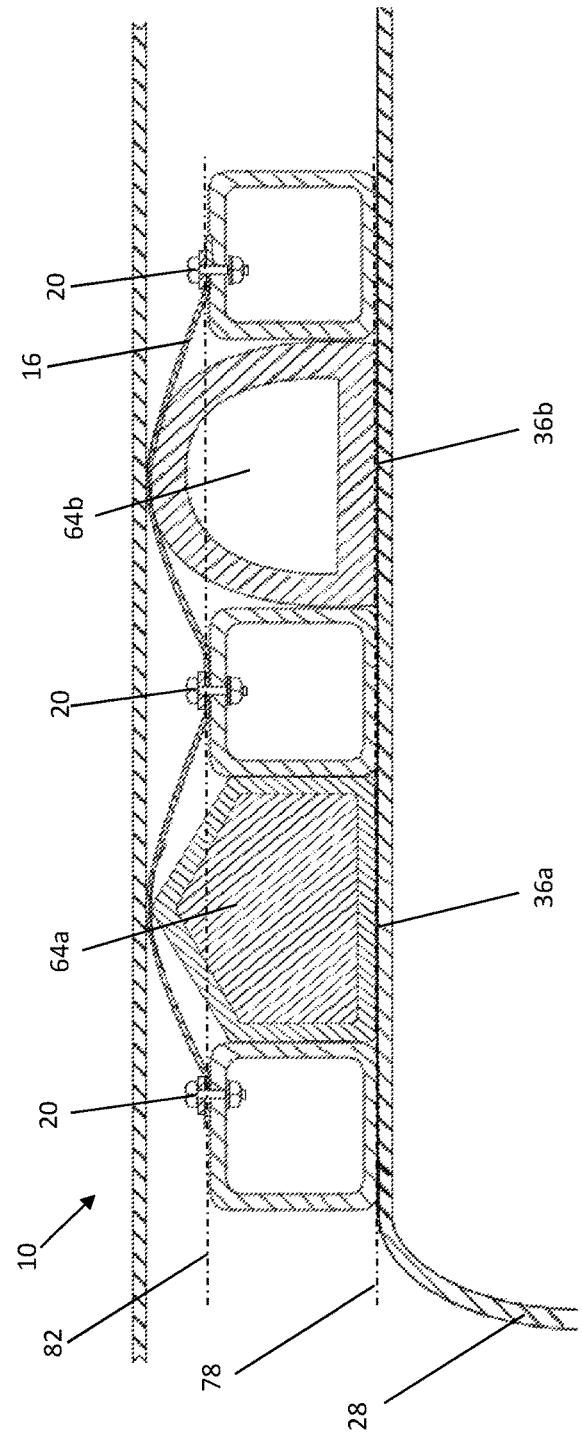
Fig. 5A
Fig. 5B

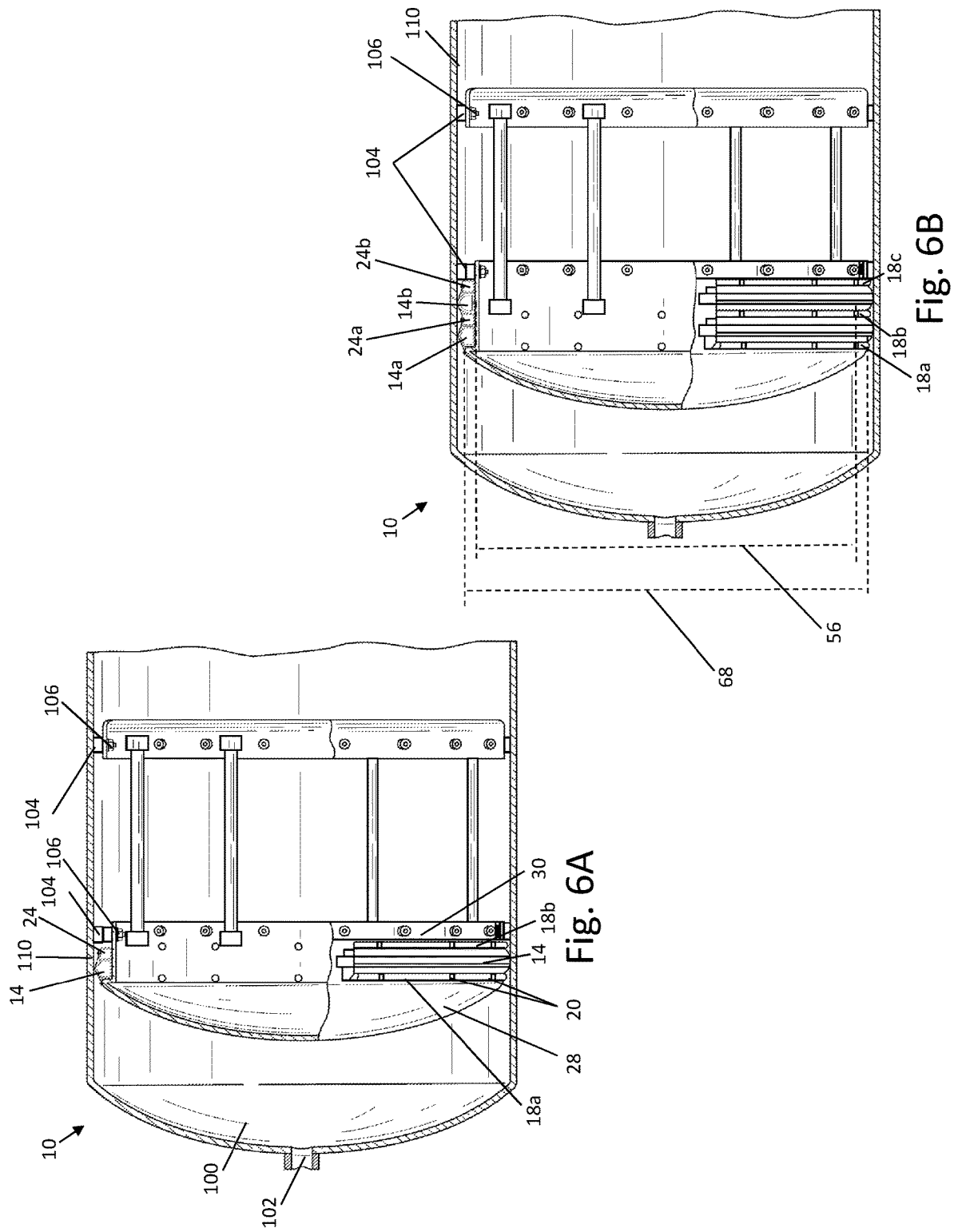

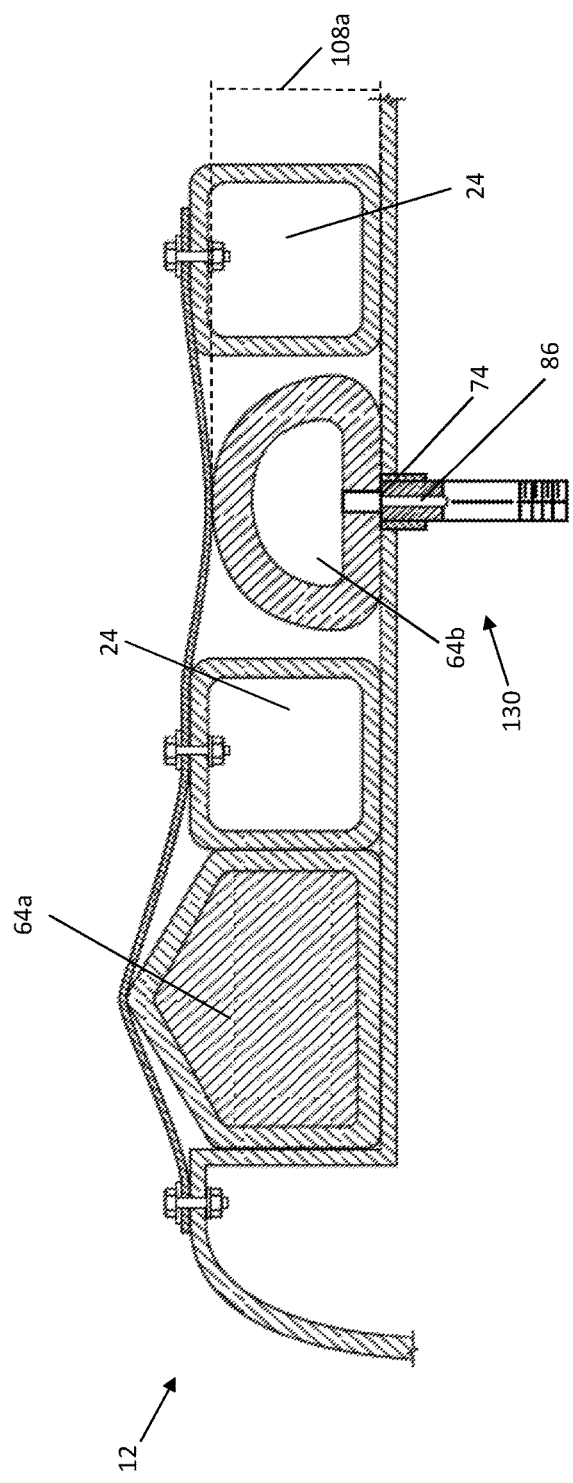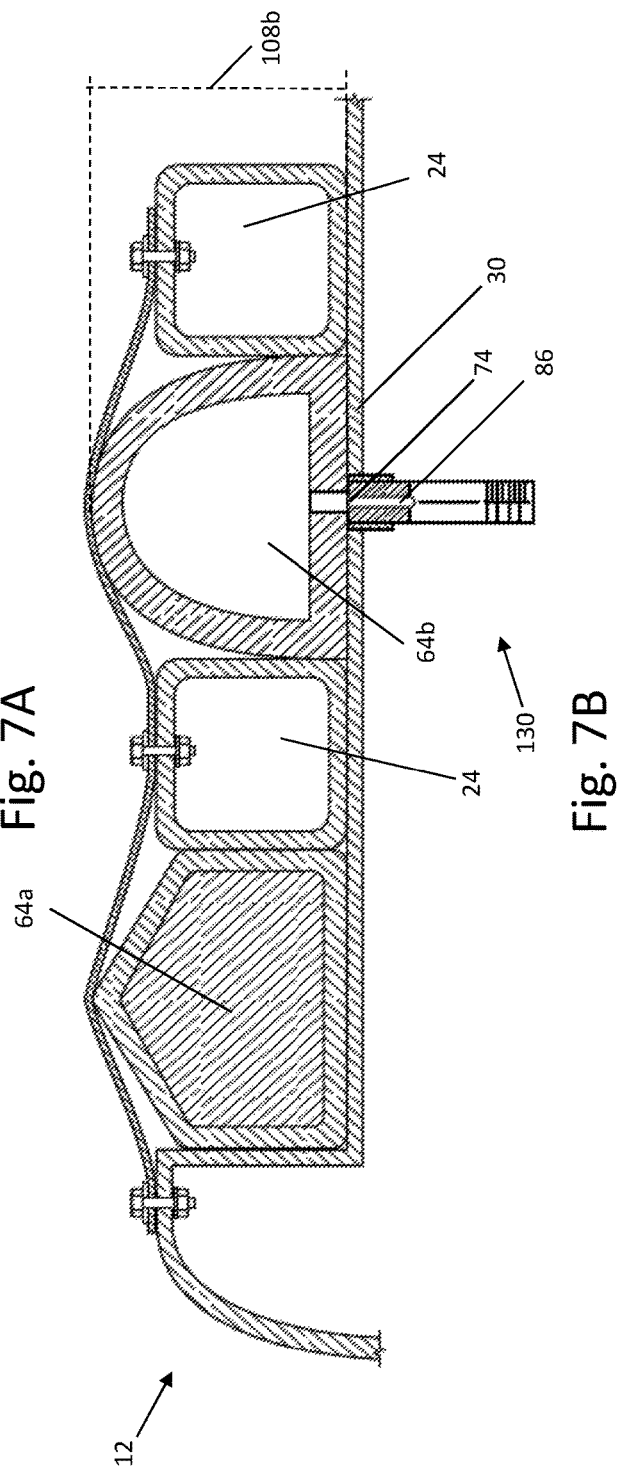

TANK PISTON WITH IMPROVED SEAL AND COVER

CROSS-REFERENCE TO RELATED APPLICATIONS

This application claims priority from U.S. Provisional Patent Application Ser. No. 62/479,806 filed on Mar. 31, 2017 which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to a piston disposed within a tank that is used to store and/or transport semisolid materials and viscous liquids, and more particularly relates to an improved seal between the interior of the tank and the piston.

Related Art

Tanks used for storing and transporting semisolid materials, such as grease, silicone, and ground or comminuted food products like peanut butter, and viscous liquids, such as oil, grease, and printing ink, typically have a reciprocating piston for pushing the material out of the tank. These tanks are usually cylindrical and have at least one outlet at one end through which the material exits the tank, such as shown in FIGS. 1A and 1B and particularly described in U.S. Pat. Nos. 5,114,054 and 7,159,508, respectively, which are incorporated by reference herein. Generally, a cylindrical piston moves within the tank to push the material through the outlet. The piston has a circumferential channel around its outer surface, and an annular seal is held within the channel. Traditionally, the piston has a cap that corresponds with the shape of the front end of the tank, whether domed, flat, or otherwise, so that the cap and tank wall are flush when the piston is in the most forward position and the tank is empty. The pistons usually have a cylindrically shaped body attached to and extending back from the periphery of the cap to provide support and attachment means for moving the piston. In other embodiments, the body also has alignment pads that contact the interior of the tank to prevent the piston from canting as it moves through the tank.

During operation, the seal remains in contact with the interior of the tank as the piston reciprocates therein and pushes material through the outlet. It is known in the prior art to use pneumatically expandable seals that are inflated so that the seal is expanded into pressured contact with the tank's interior wall, such as shown in FIG. 1C and particularly disclosed in U.S. Pat. No. 5,341,726 which is incorporated by reference herein. It is also known in the prior art to use seals made of an open cell foam material that is compressed between the piston's channel and the tank's interior wall, such as shown in FIGS. 1D and 1E and particularly disclosed in U.S. Pat. No. 6,325,384 which is also incorporated by reference herein. All of the seals function to trap most of the material in the space between the piston's cap and the tank walls.

The piston and seal assembly work together to push all material held within the tank through the outlet so the seals are designed to remain in continuous contact with the interior of the tank to prevent any material from leaking past the seal and reducing the amount of material that may remain stuck to the tank's interior wall as the piston moves through the tank. Given this continuity in the contact, the soft, pliable material of the seal is subject to friction, abrasion, and wear as it slides against the hard, rigid material of the tank which could damage the seal or cause the seal to become dislodged from the circumferential channel. Accordingly, it has long been desired to have a piston that effectively pushes all of the material through the outlet but minimizes damage caused by the sliding contact between the piston seal and tank, while still being securely held within the tank. For open cell foam seals which can be secured within the channel using fasteners that extend through the seal, it has been known to encapsulate the seal in a sheath, sheet, membrane or other cover or layer made from a low friction material such as shown in FIGS. 1F and 1G and particularly disclosed in the '384 Patent or to otherwise cover the seal and other components of the piston such as shown in FIGS. 1H and 1I, respectively disclosed in the '508 Patent and U.S. Pat. No. 5,114,054 which is incorporated by reference herein For pneumatic seals, such as disclosed in the '726 Patent (FIG. 1C), the '054 Patent (FIG. 1I), and U.S. Pat. No. 4,721,235 as shown in FIG. 1J and incorporated by reference herein, the seal had to be held in place primarily by the walls of the channel rather than by fasteners that would extend through the seal because such fasteners would prevent the pneumatic seal from holding the air pressure within the seal. In addition to securing the seal by the walls of the channel, the '054 Patent indicates that the friction-reducing sheath can also help keep the seal within the channel. However, the formation of the channel in the '054 Patent using angle rings is problematic because it leaves a large empty space between the sheath and the seal within the angle ring. As the piston moves through the tank, the material being pushed up against the front side of the sheath would force the sheath inward into the empty space, and the sheath could contact the front edge of the angle ring that forms the channel sidewall which could cause the sheath to tear or otherwise be damaged, thereby producing more friction and potentially allowing the seal to come loose from its position within the channel. Accordingly, there remains a need in the art to improve the way that a sheath or other cover can cover a seal in a piston channel to reduce frictional forces while more securely holding the seal in place within the channel; in particular, the improvement should avoid contact between the sheath and channel walls and would preferably reduce the empty space in which the sheet can deform so that the sheet is not repeatedly stretched and relaxed in each cycle of the piston, reducing the deformation of the sheet and corresponding wear on the sheet.

As indicated above, the sheath in the '054 Patent is intended to be used with an expandable pneumatic seal rather than a rubber foam seal that must be compressed between the piston's channel and the tank's inner wall. The expansion of a pneumatic type of seal is actually an important feature in the '054 Patent for keeping the sheath as taut as possible in an attempt to prevent the sheath from contacting the channel's side angle as it is forced into the large open space. Regardless of how tight the sheath is placed over a compression-type cell foam seal, the sheath must necessarily lose some of its tautness when the piston is within the tank, resulting in some slack in the sheath. Therefore, according to the design of the channels in the '054 Patent, if a non-pneumatic compression-type of seal is used, the seal would be compressed between the channel and the tank's inner wall, necessarily resulting in some slack in the sheath which would more likely cause the sheath to contact the angle ring that forms the channel's front wall, resulting in the failure of the sheath. Therefore, while the seal assembly in the '054 Patent (including the sheath, seal, and the channel design) may have some success with pneumatic seals as contemplated in the '054 Patent but would be unsatisfactory for use with cell foam seals or any other type of compression-type seal. Accordingly, not only is there a need to use a sheath to hold a seal within the piston channel without the sheath coming into contact with the channel walls, there is also a need for a configuration of the sheath, seal, and channel that will permit the sheath to be effectively used with compression-type cell foam seals as well as with expandable pneumatic seals.

SUMMARY OF THE INVENTION

Embodiments of the present invention comprise a tank piston with an improved seal having a cap, a cylindrical body connected to the periphery of the cap, a circumferential channel adjacent to the periphery of the cap, and an annular seal held within the channel by an annular sheet or other cover. In one aspect of the invention, the annular sheet secures the seal within the channel and is attached to the piston by a pair of rings positioned on opposite sides of the channel and attached to the lands adjacent to the top of the channel. In another aspect of the invention, the annular sheet is made from a friction reducing material that is sandwiched between the rings and the channel lands and enables the piston to more easily move within the tank and subsequently extend the lifespan of the seal. Another aspect of the present invention is the annular sheet attached to the piston at lands that are relatively closer to the interior wall of the tank than the base of the channel. In another aspect of the invention, the empty space between the front of the sheet and the front of the seal is minimized as compared with the prior art.

In yet another aspect of the invention, the present invention has a double seal with the primary seal adjacent to the periphery of the cap and a secondary seal positioned a distance away from the primary seal towards the rear of the piston. In this aspect of the invention, the annular sheet covers both seals and secures the seals in place with a third ring. Additionally, the primary seal is a compression-type seal formed from a composite of elastic compressible materials and the secondary seal is an expansion-type pneumatic seal assembly formed with an inflatable tubular member and a valve.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings:

FIGS. 1A-1J illustrate prior art pistons and corresponding seals.

FIGS. 2A-2C are side cross-sectional views of a tank piston seal with a single channel.

FIGS. 5A and 5B are side cross-sectional views of a tank piston seal having a pair of channels between a set of annular mounting brackets.

FIGS. 6A and 6B are partial side cross-sectional views of a piston for a tank having a single seal and double seal within a tank, respectively.

FIGS. 7A and 7B are cross-sectional side views of a tank piston having a pneumatic seal and valve assembly.

DETAILED DESCRIPTION OF THE PREFERRED EMBODIMENTS

Figure 3A:
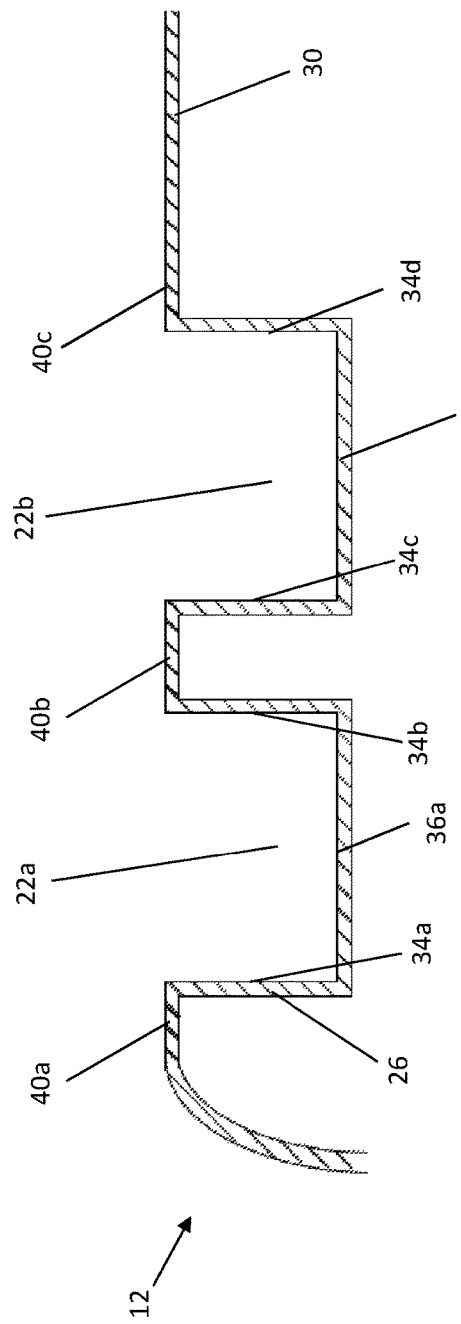
FIGS. 3A and 3B are side cross-sectional views a tank piston seal with a pair of recessed channels.
Figure 3B:
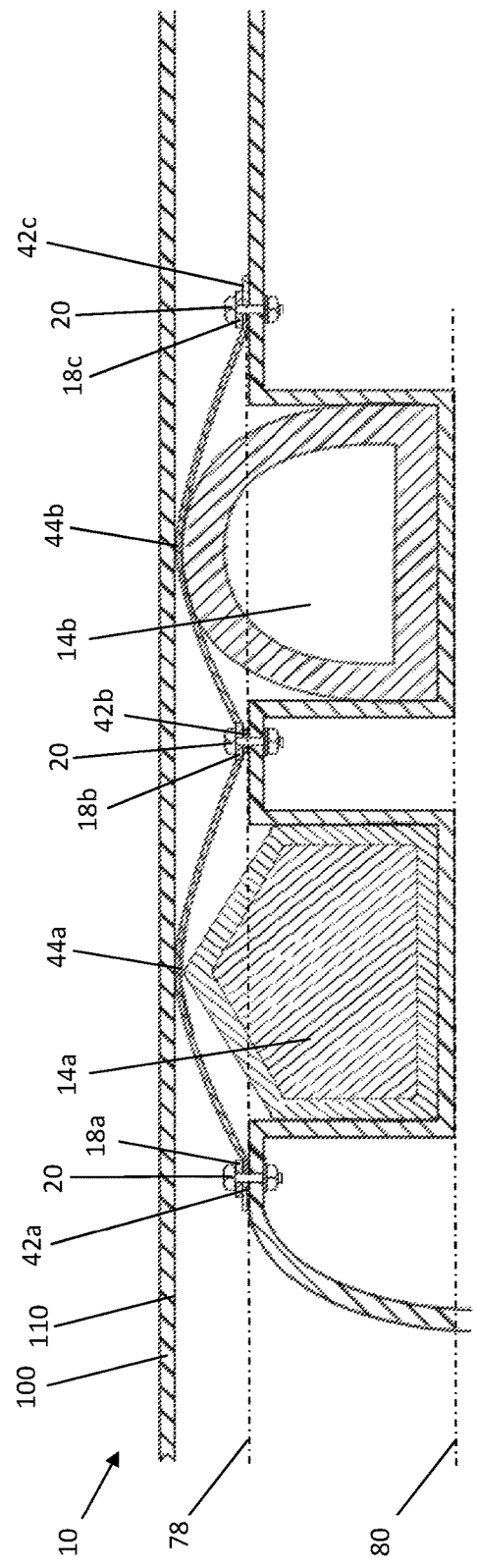

The following description of the preferred embodiment(s) is merely exemplary in nature and is in no way intended to limit the invention, its application, or uses.

Generally, as shown in FIGS. 2-6 and 8, the present invention is a sealed piston 10 having a piston 12 with a cap 28 and a cylindrical body 30. The cylindrical body has a circumferential channel 22 with an annular seal 14 having a bottom portion 60a held within the channel by at least a partial friction fit and an upper portion 60b radially extending from the bottom portion and protruding out of the channel. An annular sheet 16 covers the entire upper portion of the annular seal, and opposite ends of the sheet are sandwiched between rings 18 and lands 40 on opposite sides of the channel. The rings are secured to the lands to keep the sheet taught over the upper portion of the seal to further secure the seal within the channel. Additionally, the piston body has alignment pads 104 that contact the interior wall 110 of the tank 100 to prevent the piston from canting as it moves through the tank which may be attached with bolts or similar pad fasteners 106.

The cylindrical body is connected to a periphery 32 of the cap and extends longitudinally away from the cap towards the opposite end of the tank when the piston is positioned therein. The cap has a rounded cross section and corresponds with the shape of the portion of the tank through which the piston pushes the material held within the tank. The cylindrical body is connected to and extends away from the periphery of the cap through a portion of the tank. The cylindrical cross-sectional shape of the body generally corresponds with the cylindrical cross-sectional shape of the tank with a body diameter 56 slightly smaller than the diameter of the tank 120 allowing the piston to move within the tank. The body includes a circumferential channel adjacent to the periphery of the cap as shown in FIG. 2A. The channel can be recessed into the body of the piston as shown in FIGS. 2A and 2B or it can be produced by attaching an annular bracket 24 to the body of the piston as shown in FIG. 2C.

Generally, the channel has a pair of sidewalls 34, a base 36 extending between the pair of sidewalls, and a pair of lands 40 respectively adjacent and perpendicular to the pair of sidewalls. Preferably, the channel is substantially rectangular in shape but may have varying shapes in other embodiments, including but not limited to a rounded base at the bottom edge 38*a* of the channel or a radius between the sidewalls and the lands at the top edge 38*b* of the channel. Although the shape is not intended to be limiting, it is an aspect of the channel to have lands that are positioned closer to the interior wall of the tank 110 than the base of the channel. As explained further below with reference to the seal and the annular sheet, the proximity of the lands to the interior wall of the tank as compared to the distance of the lands away from the channel's base minimizes the empty space between the sheet and the seal, which provides an advantage over the prior art and allows a compression-type seal to be used rather than being limited to an expansion-type pneumatic seal. However it will be appreciated by those having skill in the art that a pneumatic seal may also be effectively used, particularly in a secondary channel as explained herein.

Figure 4A:
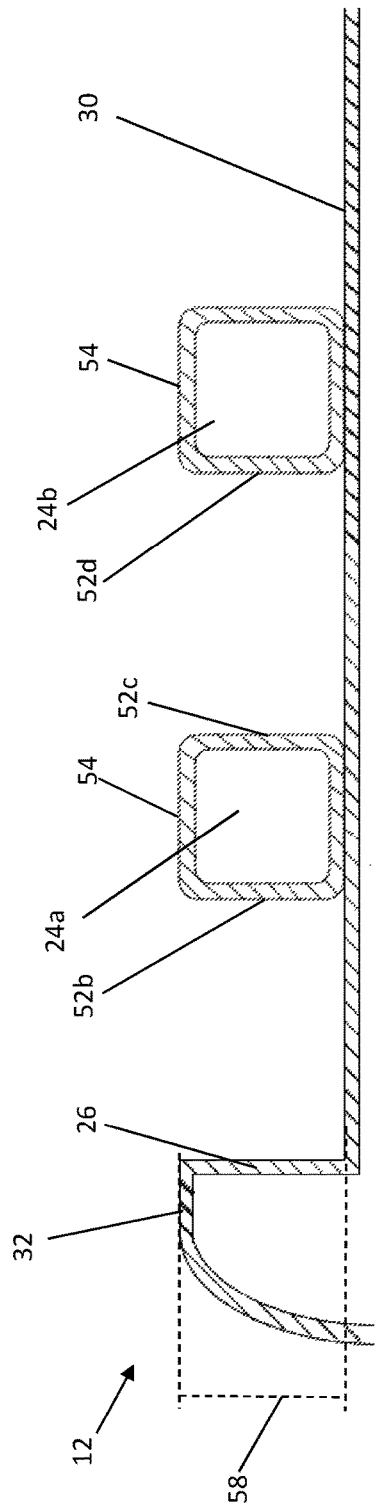
FIGS. 4A and 4B are side cross-sectional views a tank piston seal having a pair of channels between a flange and pair of annular mounting brackets.
Figure 8:
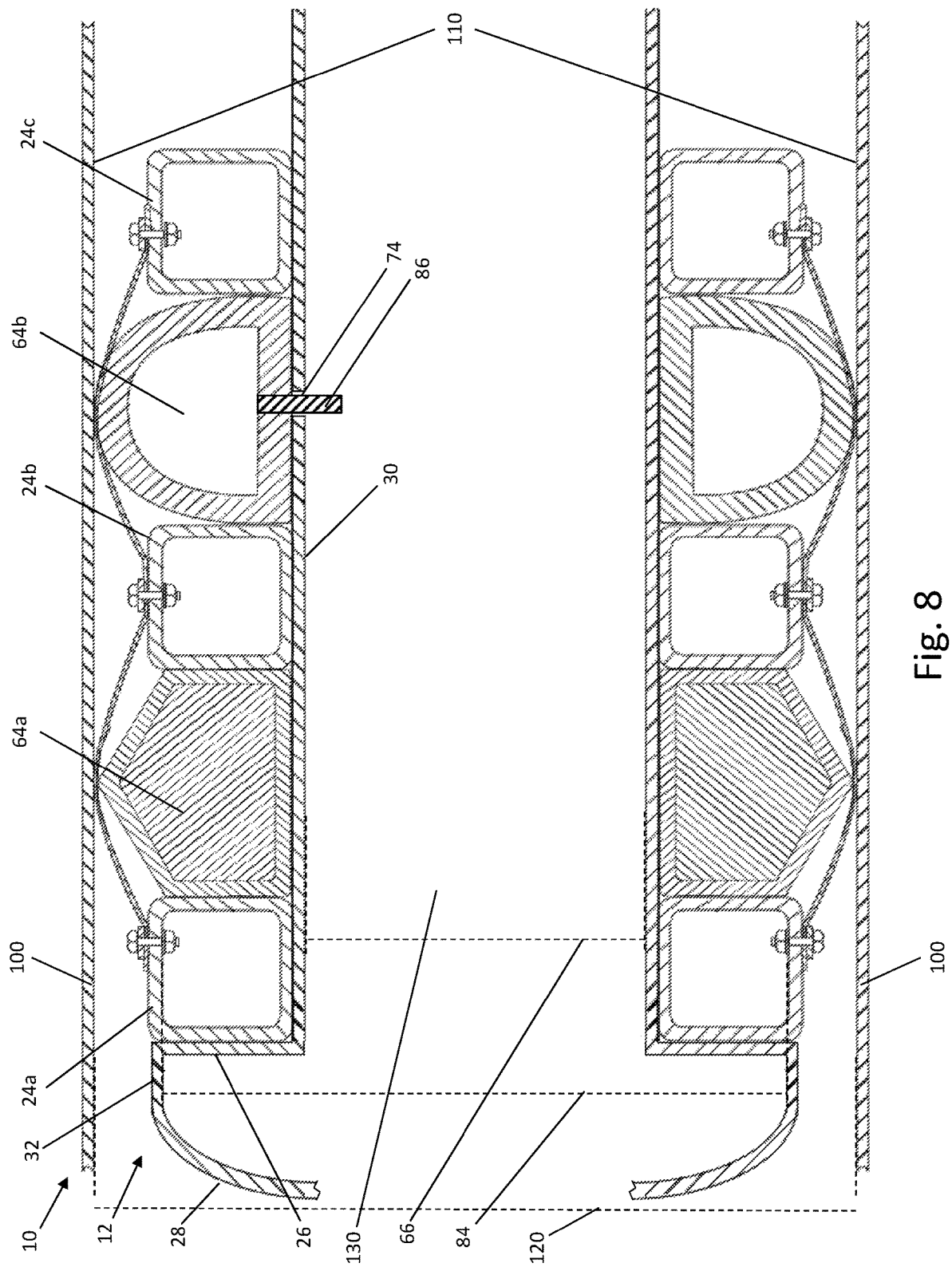
FIG. 8 is a cross-sectional view of a double-seal piston within a tank.

The piston preferably has an annular flange 26 that radially extending from the channel base to the cap periphery and connects the flange to the base as shown in FIGS. 4 and 8. Accordingly, the diameter of the cap periphery 68 is larger than the base diameter 66 where the flange connects the base to the cap periphery. The flange may form the first channel sidewall 34*a* such as shown in FIG. 4 or a bracket 24*a* may be positioned against the flange to form the channel sidewall 34*a* such as shown in FIG. 8. In these embodiments, the cap has a "mushroom" shape where the flange has a width 58 radially extending from and connecting the cylindrical body to the cap periphery. The cylindrical body defines the base of the channels and extends towards the opposite end of the tank from the cap. To form the channel for the embodiment shown in FIG. 4, a first annular mounting bracket 24*a* is attached to the body and separated from the flange by the channel base distance 50. The side surface 52*b* of the annular mounting bracket facing the flange forms the other of the pair of sidewalls 34*b*. Additionally, the opposite side surface 52*c* of the annular mounting bracket can act as another sidewall 34*c* for a secondary channel in embodiments having a double seal. The channel is similarly formed in the embodiment shown in FIG. 8 with a second annular mounting bracket 24*b*.

In the preferred embodiment the annular mounting bracket is made from a rolled square tube but it may also be other materials capable of defining a sidewall, such as from open angle structures like a "C"-shaped angle or an "L"-shaped angle or any other type of annular structure or structural segments radially mounted around the circumference of the cylindrical body to serve as a sidewall and mounting bracket for the rings described herein. Additionally, it will be appreciated that one angle, annular structure or segment could be used to form the sidewall of the channel while another angle, annular structure, or segment could be used to form the bracket for attaching the annular sheet as described herein.

Figure 4B:
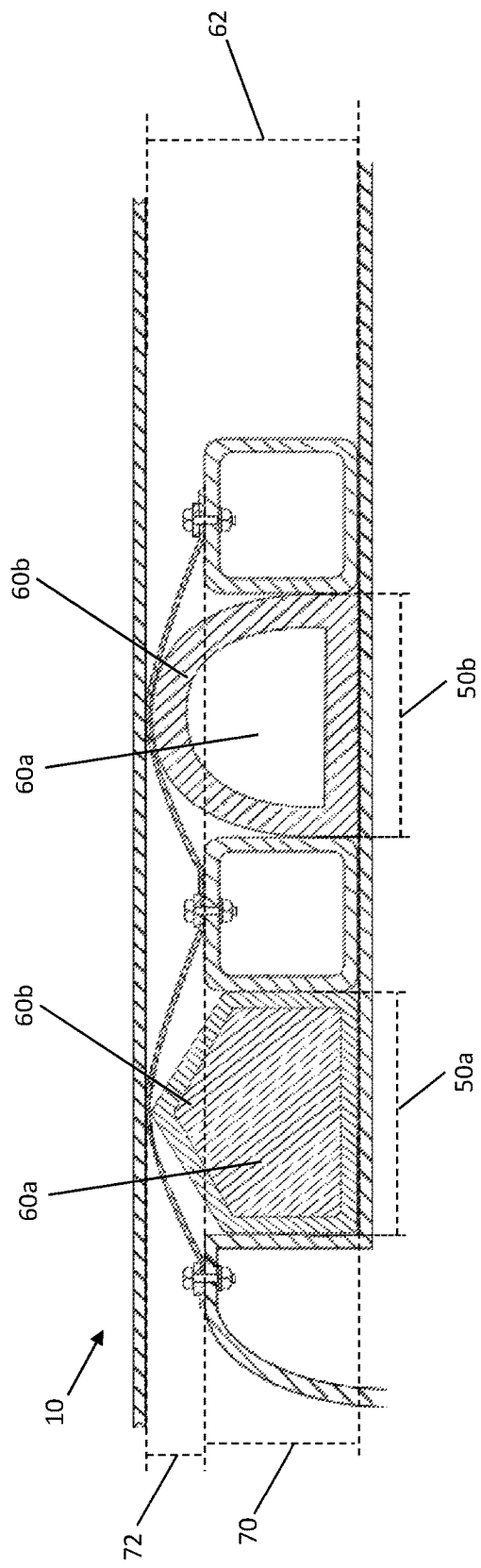

Preferably, the channel base is formed between the flange and the annular mounting bracket attached to the body. In this embodiment, the periphery of the cap forms one of the lands 40*a* and a radially outward facing surface 54 of the annular mounting bracket forms the second 40*b* of the pair of lands. As shown in FIG. 4B the lands are relatively closer to the tank wall than the base of the channel. Additionally, the lands are preferably equidistant from the interior wall of the tank and the base of the channel.

In another embodiment, the cap has a radially extending flange as descried above forming a sidewall of the primary channel, such as shown in FIGS. 2 and 3, but the body of the cylinder is aligned with the periphery of the cap. Accordingly, the flange extends from the periphery of the cap to the base of the primary channel recessed from the body. In this embodiment the body is aligned with the periphery of the cap, namely at a radial location 78 that is closer to the interior wall of the tank and the circumferential channel is recessed to another radial location 80. Accordingly, the circumferential channel is recessed from the body of the cylinder with the sidewalls extending from the base of the channel to the lands along the body of the cylinder aligned with the periphery of the cap. In this embodiment the lands have a diameter 84 that is equal to the cap diameter and body diameter as shown in FIG. 8 but the diameter of the lands remains greater than the diameter of the base as the lands are relatively closer to the interior wall of the tank in any embodiment including those described herein.

Additionally, and as shown in FIG. 3, an embodiment of the present invention may have a double seal with a pair of recessed channels. In either the single or double seal embodiment the sidewalls are separated by the width of the channel and the seal has a portion within the channel and portion extending outside of the channel past the lands towards the interior wall of the tank where the height of the portion of the seal extending out of the channel past the lands is less than the channel width and height.

In another embodiment, the cylinder body does not have a recessed channel cut therefrom, but instead has one or more raised channels between annular mounting brackets attached around the outer edge of the body adjacent to the cap periphery as illustrated in FIG. 5. In this embodiment a pair of annular mounting brackets are spaced a distance from each other and fixedly attached to the cylindrical body. As shown in FIG. 5 the first annular bracket is attached to the cylinder adjacent to the periphery of the cap, the second annular bracket 24*b* is spaced the distance 50*a* of the primary base 36*a* from the first bracket, and a third annular mounting bracket 24*c* is spaced the distance 50*b* of the secondary base 36*b* from the second bracket. The annular brackets have a pair of side surfaces facing each other which form the pair of sidewalls. Additionally, each one of the annular brackets has a radially outward facing surface to form the pair of lands which are aligned at a radial location 82 removed from the cap periphery and cylinder body. Accordingly the land diameter is greater than the base diameter such as described above. Further, the third annular mounting bracket may be added to form a secondary channel, such as shown in FIGS. 5A and 5B.

Another aspect of the present invention is the annular seal disposed within the channel discussed above and indicated in FIGS. 2-5. A bottom portion of the seal is held between the sidewalls and an upper portion extends radially out of the channel beyond the pair of lands. The seal is held within the channel and is in constant contact with the interior of the tank as the piston moves within the tank. Accordingly, as the piston moves towards the tank outlet 102 (shown in FIGS. 1A,1B and 6) the seal scrapes all material along the side of the tank towards the outlet. The seal is generally made from a composite material capable of compressing and expanding to fit different cross-sections of the tank but may also be an air filled seal that can be inflated through an air valve 86 protruding radially inward into an interior region 130 of the piston through an aperture 74 in the body of the base of the channel as shown in FIGS. 7 and 8. In the preferred embodiment, the primary seal is a composite seal 64*a* made with compressible elastic materials, and the secondary seal has a pneumatic seal and valve assembly 64*b*. It will be appreciated that composite seals and pneumatic seals can be used with each other or independently from each other.

As particularly described in the '384 Patent, composite seals can be made with one or more layers of open celled foam material, such as a rubber compound, polyurethane, or the like, or a gel can be used in place of the open celled foam material or in combination with the foam layers. Generally, the composite seal is made with elastically compressible materials that are contained within a flexible cover in order to provide and impart a resiliency effect to the seal structure. The pneumatic seal can be formed with an inflatable tube that has a valve mechanism. Regardless of the seal materials, the composite seal or the pneumatic seal extends between and contacts the sidewalls of the channel and also contacts the base of the channel such that the seal is held within the channel by at least partially by a friction fit engagement. As indicated above and explained in detail below, the annular sheet further secures the seal within the channel. Preferably, a composite seal has an uncompressed height that is approximately twice the compressed height of the seal. In comparison, an air seal preferably has an uninflated height $108a$ as shown in FIG. 7A that is slightly smaller than its inflated height $108b$ as shown in FIG. 7B. As the channel height 70 is smaller than the seal height, the top portion of the seal protrudes above the top of the channel sidewalls and the pair of lands to span the distance 72 between the piston and the interior wall of the tank while the bottom portion of the seal is held within the channel.

Another aspect of the present invention is the annular sheet securing the annular seal within the channel as shown in FIGS. 2B, 2C, 3B, 4B, 5B, 6A, 6B, 7A, 7B, and 8. The annular sheet is made of a friction reducing material, such as a TEFLON® sheet, or another low-friction material that is resistant to bonding and sticking to the interior surface of the tank. The annular sheet is comprised of side sections 42 connected to the lands and a center section 44 between the seal and the interior wall of the tank. The front section $42a$ of the sheet is connected to the body of the piston at the land that is either a part of the cap periphery or is an annular mounting bracket proximate to the cap periphery. Accordingly, the front of the sheet is attached to the front land at a position radially closer to the interior wall of the tank than the base of the channel. Additionally, the radial location of the lands is preferably spaced a distance from the base of the channel that is greater than half the distance 62 between the interior wall of the tank and the base of the channel. Accordingly, the diameter of the land is greater than the diameter of the channel base and the set of lands are aligned and equidistant from the interior wall of the tank. In the preferred embodiment, the front of the sheet is attached to the body in a position above the top edge of the channels front sidewall. However, for an embodiment such as shown in FIG. 5, it will be appreciated that the front of the sheet may actually be secured to the front surface $52a$ of the annular mounting bracket and wrap over a front radial edge of the mounting bracket.

Regardless of the particular type of connection of the sheet to the piston, the proximity of the land to the interior wall of the tank as compared to the radial distance between the channel's base and the interior wall minimizes the empty space between the sheet and the seal. The reduced space between the sheet and the seal, as compared with prior art piston devices, significantly reduces the amount of deflection to the sheet when the piston is pushing against the material in the tank. The raised connection point of the sheet proximate to the interior wall of the tank allows the sheet to maintain its tautness when a compression-type seal is installed in the channel. According to the design improvements of the present invention, the front section of the sheet is not pushed into contact with an edge of a bracket that creates the channel. The present invention overcomes the problems of the prior art, as illustrated in FIG. 1A, which may tear or otherwise damage the low-friction material when the front section of the sheet is pushed inward and may contact a bracket edge. The sidewall of the channel is below the front section of the sheet that is secured to the land adjacent to the top of the channel, and the middle section of the sheet covers the entire upper portion of the seal that protrudes out of the channel above the channel's front sidewall. The sheet is pulled tight against the front of the seal with a center section over the top of the seal and a rear section that extends to the land adjacent to the channel's back sidewall.

The rear section of the sheet $42b$ is stretched past the seal and attached to the land that is adjacent and proximate to the rear sidewall. When the pair of sheet sides are attached to at least a portion of the pair of lands, the center section $44a$ covers the portion of the annular seal extending out of the channel and between the lands. Additionally, the sheet itself is attached to the piston by annular rings with one ring $18a$ positioned on the opposite side of the channel from the other ring $18b$. When mounted to the lands, the pair of rings sandwich the side sections of the annular sheet between the outer surfaces 46 of the lands and the inner surfaces of the rings 48. Accordingly, the rings and sheet hold the seal within the channel and provide additional security to the connection between the seals and the channel in addition to the friction fit connection between the sides of the seal and the sidewalls of the channel. Accordingly, the annular sheet offers an alternative way for securing the seal within the channel which avoids the use of pins or other fasteners that extend through the seal as in the prior art, as illustrated in FIGS. 1B and 1C. Instead, in the preferred embodiment, a plurality of fasteners 20 extend through the rings and the annular sheet to hold both to the piston, and in doing so trap the sheet between the pair of rings and pair of lands. Although not intending to be limiting, sufficient fasteners may include but are not limited to rivets, screws, bolts, and pins.

The rings are preferably formed from stainless steel bands that are solid strips of metal. According to the preferred embodiments, the bands are wrapped around the entire circumference of the lands over the sheet in the form of the ring, and the ring is clamped down and fastened directly to the land with multiple fasteners, sandwiching the sheet between the interior side of the ring and the exterior face of the land.

In another embodiment, the improved piston seal may have a double seal, with a primary annular seal $14a$ and a secondary annular seal $14b$ held in a primary channel $22a$ and secondary channel $22b$ respectively, such as shown in FIGS. 3-5. Multiple annular mounting brackets may be attached to the piston's cylindrical body or multiple channels may be recessed from the piston's body. Regardless of the channel embodiment, the double seal preferably has a primary seal proximate to the cap that is made of a composite material and a secondary seal that is made from a pneumatic seal and valve assembly formed with an inflatable tubular member $64b$ and a valve 74. The pneumatic air seal is fit within the secondary channel and the air valve is oriented within an aperture in the body of the piston. Another section $44b$ of the annular sheet extends past the middle land $40b$ to cover the secondary seal in this double seal embodiment. Accordingly, a third section $42c$ of the sheet is attached to the land $40c$ proximate to the side surface $52d$ of the rear wall $34d$ of the secondary channel. To ensure the sheet and seal remain attached, a third ring 18c is used and is attached to the rearward land with additional fasteners.

In describing the apparatus of the present invention, persons of ordinary skill in the art will appreciate that there are a number of materials that could be used for the structural components of the double piston seal which non-exclusively include the cap, body, and annular brackets. The piston is preferably formed from a metal cap, body and annular bracket, such as steel. However, the invention is not limited to metal pistons, and it is possible that the pistons for some applications could be formed using reinforced plastic or other materials.

The embodiments of the tank piston having an improved seal was chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting.

What is claimed is:

1. A sealed piston for pushing material out of a tank, comprising:
    a piston comprising a cap, a cylindrical body, and a first circumferential channel, wherein the cylindrical body is connected to a periphery of the cap and extends longitudinally away therefrom, wherein the first circumferential channel is comprised of a pair of sidewalls each extending a first radial distance from a bottom end to a top end, a base longitudinally extending between the bottom end of each of the pair of sidewalls, and a pair of lands respectively adjacent to the top end of each of the pair sidewalls;
    a primary annular seal having a bottom portion situated within the first circumferential channel and contacting the sidewalls and the base and having an upper portion extending a second radial distance out of the first circumferential channel beyond the pair of lands;
    an annular sheet comprising a pair of side sections and a center section between the side sections, wherein the center section covers the entire upper portion of the annular seal, wherein the pair of side sections cover at least a part of each one of the pair of lands;
    a pair of rings positioned on opposite sides of the first circumferential channel from each other, wherein the pair of rings sandwich the pair of side sections of the annular sheet between an outer surface of the pair of lands and an inner surface of the pair of rings; and
    a plurality of fasteners securing the pair of rings around the pair of lands.

2. The piston of claim 1, wherein the piston is further comprised of a radially extending flange connecting the cap to the cylindrical body, wherein the periphery of the cap has a first diameter greater than a second diameter of the cylindrical body, and wherein the first radial distance of the first circumferential channel containing the bottom portion of the seal is greater than the second radial distance of the upper portion of the seal extending out of the first circumferential channel beyond the pair of lands.

3. The piston of claim 2, wherein the periphery of the cap forms one of the pair of lands, wherein the flange has a radial width substantially equal to the first radial distance and forms one of the pair of sidewalls, and wherein the cylindrical body adjacent to the flange forms the base of the first circumferential channel.

4. The piston of claim 3, wherein the piston is further comprised of a first annular mounting bracket mounted to the cylindrical body and spaced a first longitudinal distance from the flange, wherein the first annular mounting bracket has a side surface facing the flange and forms another of the pair of sidewalls, and wherein the first annular mounting bracket has a radially outward facing surface to form another of the pair of lands, and wherein the plurality of fasteners extend through the lands.

5. The piston of claim 4, further comprising a second annular mounting bracket, a secondary annular seal, a second circumferential channel, and a third ring, wherein the second annular mounting bracket is spaced a second longitudinal distance from the first annular mounting bracket and mounted to the cylindrical body, wherein the first annular mounting bracket and the second annular mounting bracket form the second circumferential channel, wherein second annular seal is situated in the second circumferential channel, wherein the annular sheet extends past the radially outward facing surface of the first annular mounting bracket and over the secondary annular seal to the second annular mounting bracket, wherein the fasteners extend through the third ring and the annular sheet and connect the third ring to the second annular mounting bracket, and wherein the primary annular seal and the secondary annular seal are selected from the group of seals consisting of a composite seal with layers of seal materials, a pneumatic seal with a valve assembly, and any combination thereof.

6. The piston of claim 5, wherein the valve assembly comprises a valve protruding radially inward into an interior of the piston through an aperture in the base of at least one of the first circumferential channel and the second circumferential channel.

7. The piston of claim 2, wherein the piston is further comprised of a pair of annular mounting brackets spaced a first longitudinal distance from each other, wherein the annular mounting brackets are fixedly attached to and surround the cylindrical body, wherein the annular mounting brackets have a pair of side surfaces facing each other to form the pair of sidewalls, and wherein each one of the annular mounting brackets has a radially outward facing surface to form each one of the respective pair of lands.

8. The piston of claim 1, wherein the pair of lands are aligned with each other and are substantially perpendicular to the sidewalls of the channels.

9. The piston of claim 1, wherein the fasteners are comprised of a first set of fasteners extending through a first one of the pair of rings and a first one of the side sections of the annular sheet and a second set of fasteners extending through a second one of the pair of rings and a second one of the side sections of the annular sheet.

10. The piston of claim 1, wherein the pair of sidewalls of the channel are separated by a first longitudinal distance corresponding with a channel width, and wherein the second radial distance of the upper portion of the seal extending out of the channel beyond the pair of lands is less than the channel width and less than the first radial distance of the channel containing the bottom portion of the seal and corresponding with a channel height.

11. A sealed piston for pushing material out of a tank, comprising:
    a piston comprising a cap, a radially extending flange, a first annular mounting bracket, and a cylindrical body, wherein the flange connects the cylindrical body to a periphery of the cap, wherein the cylindrical body extends longitudinally away from the flange and the first annular mounting bracket is mounted to the cylindrical body at a first longitudinal distance spaced from the flange, wherein the first annular mounting bracket has a first side surface facing the flange and a radially outward facing surface, wherein the first side surface and the flange each extend a first radial distance from the cylindrical body and collectively form a pair of sidewalls of a first circumferential channel, wherein a segment of the cylindrical body between the first side surface and the flange forms a base of the first circumferential channel, wherein the periphery of the cap and the radially outward facing surface form a pair of lands respectively adjacent to the flange and the first side surface;

a primary annular seal having a bottom portion situated within the first circumferential channel and contacting the sidewalls and the base in a friction fit engagement and having an upper portion extending a second radial distance out of the first circumferential channel beyond the pair of lands;

an annular sheet comprising a pair of side sections and a center section between the side sections, wherein the center section covers the entire upper portion of the annular seal, wherein the pair of side sections cover at least a part of each one of the pair of lands;

a pair of rings positioned on opposite sides of the first circumferential channel from each other, wherein the pair of rings sandwich the pair of side sections of the sheet between an outer surface of the pair of lands and an inner surface of the pair of rings; and a plurality of fasteners securing the pair of rings around the pair of lands.

12. The piston of claim 11, further comprising a second annular mounting bracket, a secondary annular seal, and a third ring, wherein the second annular mounting bracket is spaced a second longitudinal distance from the first annular mounting bracket and mounted to the cylindrical body to form a second circumferential channel, wherein the secondary annular seal is situated in the second circumferential channel, wherein the annular sheet extends past the radially outward facing surface of the first annular mounting bracket and over the secondary annular seal to the second annular mounting bracket, wherein another set of fasteners secure the third ring around the second annular mounting bracket, and wherein the primary annular seal and the secondary annular seal are each at least one of a composite seal with layers of seal materials and a pneumatic seal with a valve assembly.

13. The piston of claim 12, wherein the valve assembly comprises a valve protruding radially inward into an interior of the piston through an aperture in the base of at least one of the first circumferential channel and the second circumferential channel.

14. The piston of claim 11, wherein the fasteners are comprised of a first set of fasteners extending through a first one of the pair of rings and a first one of the side sections of the annular sheet and a second set of fasteners extending through a second one of the pair of rings and a second one of the side sections of the annular sheet.

15. The piston of claim 11, wherein the pair of sidewalls of the channel are separated by a first longitudinal distance corresponding with a channel width, and wherein the second radial distance of the upper portion of the seal extending out of the channel beyond the pair of lands is less than the channel width and less than the first radial distance of the channel containing the bottom portion of the seal and corresponding with a channel height.

16. A sealed piston for pushing material out of a tank, comprising:

a piston comprising a cap, a cylindrical body, a first circumferential channel, and a second circumferential channel, wherein the cylindrical body is connected to a periphery of the cap and extends longitudinally away therefrom, wherein the first circumferential channel is comprised of a first pair of sidewalls each extending to a top end at a first radial distance from a bottom end at the cylindrical body and a first pair of lands respectively adjacent to the top end of each of the pair sidewalls, wherein the second circumferential channel is comprised of a second pair of sidewalls, at least one additional land adjacent to a corresponding top end of a longitudinally distal one of the second pair of sidewalls, and a corresponding bottom end at the cylindrical body situated between the longitudinally distal one of the second pair of sidewalls and a longitudinally proximal one of the second pair of sidewalls;

a composite annular seal having a first bottom portion situated within the first circumferential channel and contacting the first pair of sidewalls and the first base and having a first upper portion extending a second radial distance out of the first circumferential channel beyond the first pair of lands, and wherein the first radial distance is greater than the second radial distance;

a pneumatic annular seal having a second bottom portion situated within the second circumferential channel and contacting the second pair of sidewalls and the second base and having a second upper portion extending the second radial distance out of the second circumferential channel beyond the first pair of lands when in a fully inflated state and extending a third radial distance out of the second circumferential channel beyond the first pair of lands when in a partially inflated state, and wherein the second radial distance is greater than the third radial distance;

an annular sheet comprising a first section adjacent to a first side of the annular sheet, a second section adjacent to a second side of the annular sheet, and an intermediate section between the first section and the second section, wherein the first section covers the first upper portion of the composite annular seal and at least a part of the periphery of the cap, wherein the second section covers the second upper portion of the pneumatic annular seal and at least a part of the additional land adjacent to the corresponding top end of the longitudinally distal one of the second pair of sidewalls, and wherein the intermediate section covers an entirety of one of the first pair of lands closest to the second pair of sidewalls;

a set of rings comprising a first ring, a second ring, and a third ring, wherein the first ring and the second ring are positioned on opposite sides of the first circumferential channel and the second circumferential channel from each other, wherein the first ring sandwiches the first section of the annular sheet between a first outer surface of one of the first pair of lands most proximate to the cap and an inner surface of the first ring, wherein the second ring sandwiches the second section of the annular sheet between a second outer surface of the additional land adjacent to the corresponding top end of the longitudinally distal one of the second pair of sidewalls, wherein the third ring sandwiches the intermediate section of the annular sheet between a third outer surface of the one of the first pair of lands closest to the second pair of sidewalls and an inner surface of the third ring; and a plurality of fasteners securing the set of rings around the corresponding lands.

17. The piston of claim 16, wherein the corresponding top end of the longitudinally distal one of the second pair of sidewalls is positioned the first radial distance from the cylindrical body.

18. The piston of claim 16, wherein the piston is further comprised of a radially extending flange connecting the cap to the cylindrical body, and wherein the periphery of the cap forms the one of first pair of lands most proximate to the cap.

19. The piston of claim 18, wherein the piston is further comprised of a first annular mounting bracket and a second annular mounting bracket, wherein the first annular mounting bracket is mounted to the cylindrical body and spaced a first longitudinal distance from the flange, wherein the second annular mounting bracket is mounted to the cylindrical body and spaced a second longitudinal distance from the first annular mounting bracket, wherein the first circumferential channel is situated between the flange and the first annular mounting bracket, and wherein the second circumferential channel is situated between the first annular mounting bracket and the second annular mounting bracket.

20. The piston of claim 16, wherein the fasteners are comprised of three sets of fasteners extending through corresponding sets of rings and respective sections of the annular sheet.

\* \* \* \* \*